Aug. 21, 1962  E. F. W. ALEXANDERSON  3,050,672
ELECTRIC MOTOR CONTROL APPARATUS
Filed April 17, 1961
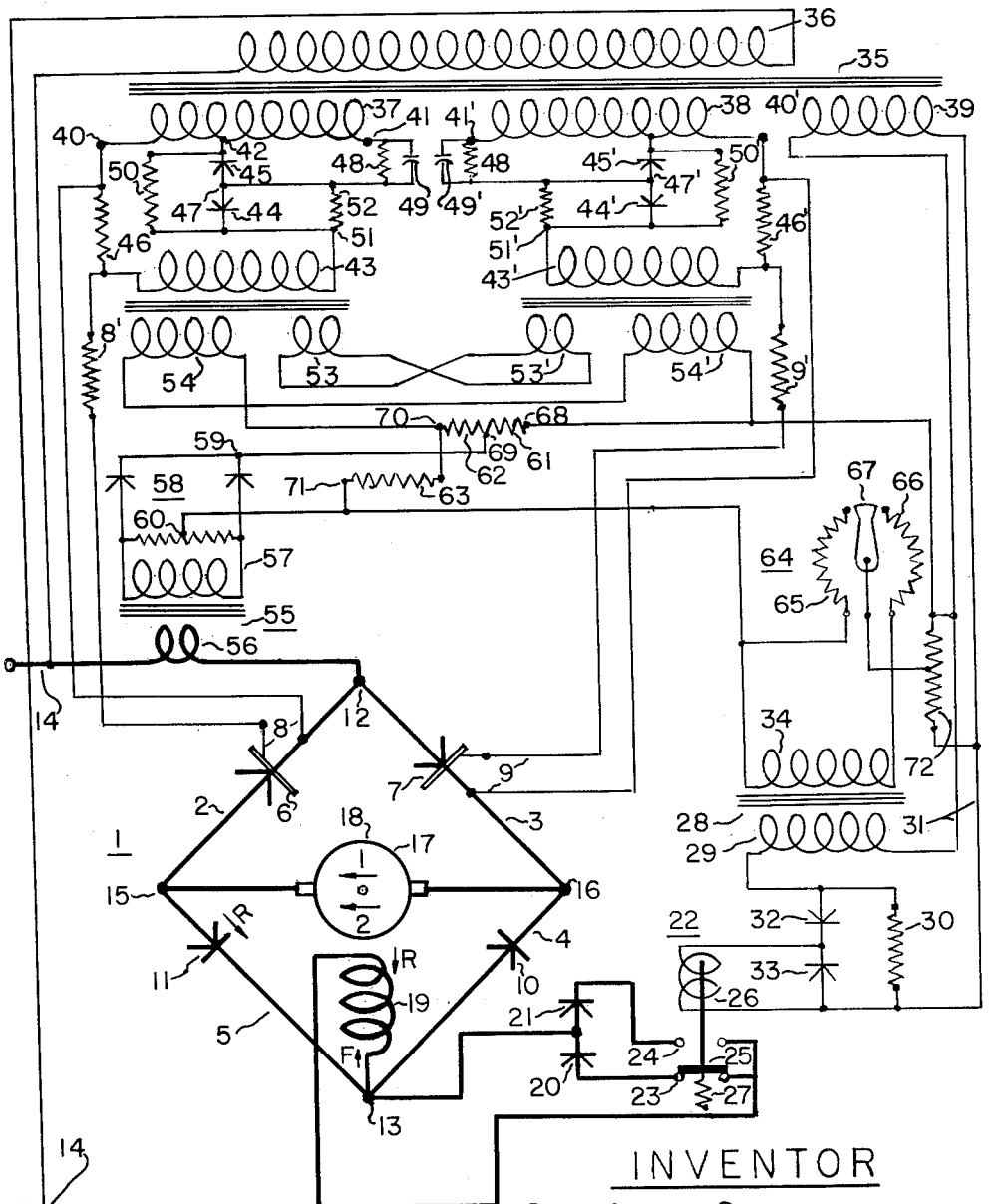
INVENTOR
Ernst F. W. Alexanderson

United States Patent Office 3,050,672
Patented Aug. 21, 1962

3,050,672
ELECTRIC MOTOR CONTROL APPARATUS
Ernst F. W. Alexanderson, 1132 Adams Road,
Schenectady, N.Y.
Filed Apr. 17, 1961, Ser. No. 103,620
8 Claims. (Cl. 318—257)

My invention relates to electric motor control apparatus and more particularly to a reversible speed and torque system of motor control for direct current motors.

The present invention is a further development and an improvement of the system described and claimed in my application Serial No. 842,515, filed September 25, 1959, and entitled "Electric Control Apparatus." In this prior system half-wave magnetic amplifiers are incorporated in and form a part of the motor power circuit network. It has been found to be desirable to retain the characterizing operating features of the prior system but to eliminate from the power circuit the magnetic amplifiers and substitute in lieu thereof controllable triodes and particularly semiconductor triodes having a control electrode or gate circuit whereby to control the power flow in the motor power circuit.

It is an object of my invention to provide a new and improved magnetic amplifier control system for direct current motors in which magnetic amplifier circuitry is incorporated in the control circuit as distinguished from the power circuit without, however, sacrificing the features of operation and control which characterize the magnetic amplifier network of my above-mentioned prior application.

It is another object of my invention to provide a new and improved system for controlling the speed and torque and the direction of rotation of a direct current motor.

It is a further object of my invention to provide a new and improved motor control system utilizing controlled triodes in the motor power circuit.

Briefly stated, in accordance with one aspect of my invention as illustrated in the embodiment of the single FIGURE of the drawing, I provide an electric network in the form of a four-arm bridge circuit having two sets of conjugate terminals with a direct current motor connected as a diagonal across one set of conjugate terminals and with two controlled semiconductor triodes each respectively connected in adjacent arms of the bridge leading from the motor terminals to one of the conjugate terminals of the other set of terminals. The bridge is energized from an alternating current input circuit which is connected to said other conjugate terminals. The firing of the triodes is controlled by a pair of "miniature" half-wave magnetic amplifiers each comprising a reactor-diode group including a saturable reactor with sharp saturation and a diode connected in series relation from a transformer which in turn is energized from the alternating current input circuit to the bridge network. The term "miniature" is used in a relative sense in contradistinction to a power circuit device of the same type designed for use directly in the power circuit.

In order to retain the operating characteristics of a reactor-diode motor network wherein the reactor-diodes are in the power circuit of the motor as in my prior application above-identified, there is established in the present invention a circuit relationship and control quantities relationship (controlled ratio of negative and positive feedback quantities) between the control circuit and the power circuit whereby the timing of the moment of saturation in each reactor-diode group and the firing impulse of its associated triode is made to occur at the same time so as to result in a motor network operating as though the magnetic amplifiers were directly in the power circuit rather than in the control circuit. The motor network with the relatively simple and rugged triodes, therefore, maintains by a self-regulating process a substantially constant ratio between the voltage and current of the network output circuit regardless of the absolute values of voltage and current thereof. A remote control means is provided for adjusting the ratio of voltage to current which the "miniature" reactor-diode groups tend to maintain in the network output circuit.

The motor system so arranged and controlled provides a system in which the speed of the motor may be adjusted to any desired value from standstill to its maximum speed in either direction of rotation and the torque of the motor may be adjusted with gradual transition from positive to negative torque at any operating speed without mechanical shock or abrupt change in flow of current.

The subject matter which I regard as my invention is particularly pointed out and distinctly claimed in the concluding portion of this specification. My invention, however, both as to organization and method of operation together with further advantages thereof, may best be understood by reference to the following description taken in connection with the accompanying drawing in which:

The single figure is a diagrammatic illustration of one embodiment of my invention as applied to a direct current motor control system with means for operating the motor with an adjustable reversible speed control and reversible torque control at any speed.

Referring to the drawing, I have diagrammatically illustrated one form of my "miniature" reactor-diode control circuit for a series direct current motor arranged in a bridge network with a pair of controlled rectifying semiconductor triodes. The power network 1, for purpose of illustration, is shown in the form of a four-branch bridge arrangement comprising branches 2, 3, 4 and 5. A semiconductor triode 6 is connected in arm 2 and a similar triode 7 is connected in arm 3. One suitable type of semiconductor triode is presently offered to the trade by the General Electric Company and is identified as a silicon control rectifier. The triodes 6 and 7 are provided respectively with control electrode circuits 8 and 9. Diodes 10 and 11 are connected in branches 4 and 5 respectively. Branches 2 and 3 are connected together to form a junction terminal 12 and branches 4 and 5 are connected together to form a junction terminal 13. The conjugate terminals 12 and 13 constitute alternating current input terminals to which a source of alternating current indicated by a pair of conductors 14 is connected. The remaining terminals of the bridge are conjugate terminals 15 and 16 and constitute direct current output terminals across which the armature 17 of a direct current series motor 18 is connected. The field winding 19 of the motor 18 is connected between junction terminal 13 and the lower alternating current conductor 14 (as viewed in the drawing). The respective triodes 6 and 7 and diodes 10 and 11 are arranged for full wave rectification and are so poled as to produce a unidirectional current from junction terminal 16 to junction terminal 15.

While the field winding is connected in the alternating current input circuit it is arranged to be traversed by half-waves of current of the same polarity of the alternating current circuit for one direction of rotation of the motor and by half-waves of the opposite polarity for motor operation in the reverse direction of rotation. The current in the field winding is continuous and of substantially constant amplitude because of the relatively high reactance of the field winding. To provide a reversible field excitation which is interconnected with the reactor-diode control and firing circuits of the triodes I provide a pair of diodes 20 and 21 which are selectively connected between the terminals of the field winding 19 through a relay 22 having contacts 23 and 24 and a bridging contact arm 25. The bridging arm is provided with an operating coil 26 to move contact 25 to bridge contacts 24 upon energization of its operating coil and a suitable biasing means such as a spring 27 to move and hold contacts 23 bridged when operating coil 26 is deenergized. If it be assumed that the input junction 12 is on the positive half cycle of the alternating voltage applied the current direction through the field winding would be traveling up through the field and out to the lower conductor 14. When lower conductor is on the negative half cycle of the input voltage the field winding 19 is by-passed by the closed contacts 23 and the rectifier 20. This direction of field energization may be designated as "forward" operation of the motor. If the relay is operated to close contacts 24 the field is energized by the negative half waves of the alternating voltage supply and the positive half waves are bypassed by contacts 24. This direction of energization may be designated as "reverse" operation of the motor.

The operating coil 26 of field control relay 22 is energized through a small magnetic amplifier 28 comprising a reactor coil 29 connected in series with a resistance 30 to be energized from alternating current supply conductors 31. The output of the amplifier is supplied to coil 26 through a diode rectifier 32. Another diode 33 is connected in parallel relation to relay coil 26 so as to complete the rectification circuit. A direct current control winding 34 is inductively related to reactor coil 29 and forms a part of the reactor-diode control circuit which will be described presently along with the description of the twin reactor-diode control circuitry.

The reactor-diode firing circuit utilized in the present invention is the same in principle and general circuitry as the embodiments described and claimed in my copending application filed simultaneously herewith and entitled "Electric Control Circuits." The firing circuits per se as a means for controlling triodes with a control electrode as utilized in a general direct current utilization circuit are claimed in the copending application just identified. While I have selected for purposes of illustration only one of the embodiments of the several species of reactor-diode firing control circuits described and claimed in the copending application just referred to for disclosing a reversible speed and torque system of motor control it will be understood by those skilled in the art that any one of the several firing control circuits of the aforementioned copending application may be utilized in the present system without departing from my invention in its broader aspects. The adaptation and correlation of such firing circuits in a motor control system is the subject matter to which the present invention is directed. Accordingly attention will now be directed to the details of circuitry and correlation of electric quantities of the control and motor circuits pertinent to the present motor control system.

In the single FIGURE of the drawing I have diagrammatically illustrated one form of my reactor-diode control circuit for controlling the excitation of semiconductor triodes in the electric network bridge 1. The control apparatus comprises a source of alternating voltage derived from input conductors 14 of the motor network as represented by transformer 35 having a primary winding 36 and three secondary windings 37, 38 and 39. The secondary winding 39 is a source of power for certain control windings and it will be evident that it need not be a third winding on the main control transformer so long as the voltage is derived from the alternating current input circuit in proper phase relation. The two principal secondary windings 37 and 38 are poled so that firing pulses are derived from the respective secondary windings in alternate half cycles of the voltage applied to the motor network.

The secondary winding 37 is provided with a "base" terminal 40 (so-called for purposes of identification), a "higher" voltage tap 41 and an intermediate or "lower" voltage tap 42. The reactor-diode group for generating the make-alive or firing pulse (for example on the positive half cycle) comprises a saturable reactor 43 having a sharp saturation characteristic and (in series therewith) a first diode 44. A second diode 45 with its polarity reversed relative to the first diode 44 connects the reactor-diode group to the "lower" transformer tap 42 and the opposite end of the reactor is connected through a low value load impedance element 46 to the "base" terminal 40. The firing circuit 8 of triode 6 is connected to be energized from load impedance 46 through a current limiting resistance 8'. A junction terminal 47 is established between diodes 44 and 45 and this junction terminal is connected to the higher voltage tap 41 through a resistance element 48. The resistance element 48 may be shunted by a capacitor 49 to accentuate the firing peak but depending upon the degree of sharpness of the saturation characteristic of the reactor 43 it may be found that capacitor 49 is not necessary. A resistance element 50 is connected between the low voltage tap 42 and a terminal 51 of the reactor 43 in order to provide a negative feedback quantity. A resistance element 52 is connected in shunt relation to diode 44 to establish a negative bias and suppress firing when the motor is in a standby operating condition.

A second reactor-diode group similar in all respects to the above-described reactor-diode group (except for being arranged for operation on the half cycles of applied voltage reversed with respect to that described) is associated with secondary winding 38 and corresponding elements and reference points have been assigned like primed numerals for convenience of identification.

The control elements of the reactor-diode groups in addition to those just described are constituted by control windings inductively associated with the respective reactors 43 and 43'. First, there is a pair of windings 53 and 53' reversely connected in series relation in a closed circuit and inductively associated with the respective reactors 43 and 43' for equalization and stabilization of the twin firing reactor-diode groups. The control windings 53 and 53' are connected in parallel with reference to the induced alternating voltage but a change in saturating flux in the reactors 43 and 43' induces a voltage which causes a current to flow in the closed circuit of the two windings and the effect is analogous to the antihunting effect of the amortiseur winding in synchronous machines.

Second there is a pair of control windings 54 and 54' which are reversely connected in series relation and inductively associated with reactors 43 and 43', respectively, to receive a "positive" control current or positive feedback electric quantity. The current feedback is introduced through a current transformer 55 comprising a primary winding 56 connected in series relation with input conductor 14 and a secondary winding 57. This control current is rectified by a conventional full wave diode rectifier 58 having output terminals 59 and 60 which are connected to the control circuit arranged in the form of a Wheatstone bridge. The bridge is constituted of three fixed resistance arms 61, 62 and 63 and a fourth variable resistance arm comprising the adjustable control rheostat 64. This control rheostat comprises two resistance branches or arms 65 and 66 with a contact control arm 67. This control arm is arranged to have a standby or neutral position where it makes no contact with either of the resistance arms 65 or 66 and consequently places the bridge in open circuit. To facilitate the circuit description the several junction points of the bridge have been identified as 68, 69, 70 and 71. The control coils 54 and 54' are connected to junction terminals 68 and 70 and the direct current input from rectifier 58 from its terminals 59 and 60 are connected to junction terminals 69 and 71, respectively. The fourth arm of the bridge comprising the resistance elements of control rheostat 64 are connected between junction terminals 68 and 71. Resistance element 66 is connected to junction terminal 71 through the direct current control coil 34 of reactor 28 for controlling field direction relay 22. The control arm 67 is connected to junction terminal 68 through a voltage divider 72 which is connected across the alternating voltage control circuit 31. The A.C. voltage thus introduced corrects for the dissymmetry of the forward and reverse branch of the control. The control coil 34 which activates the field relay is in the circuit only for reverse operation. The voltage induced in this coil produces a slight reaction in the main control. This reaction is equalized in forward operation by the introduction of the voltage drop in the resistance 72.

Before describing the detailed operation of the specific embodiment illustrated it may be helpful to consider in more detail the circuit relationship and control quantities relationship between the control circuit and the power circuit which made possible in accordance with my invention the use of "miniature" reactor-diode groups in the control circuit and the substitution of triodes in the power circuit to obtain the same operating characteristics as the motor control system of my prior application Serial Number 842,515 which was referred to above.

The system of control described in my prior application makes it possible to operate a direct current motor with an adjustable reversible speed control and reversible torque control at any speed. This is accomplished by a system of feedbacks originating in the power circuit. A feedback electric quantity proportional to power current is opposed by a feedback electric quantity proportional to the rectified voltage in the power circuit. The ratio of these two feedback quantities determines the speed and torque at which the motor tends to operate and this ratio is adjustable by the operator. In substituting the triodes in the power circuit for the magnetic amplifiers the prior source of one of the feedback quantities is thus eliminated and it became necessary to create equivalent electric quantities which can be used in a feedback system to fire the control electrodes of the triodes in the same manner as the controlled moments of saturation in the prior power reactor-diode groups. In accordance with my invention I have found that the voltage across the diode in the miniature reactor-diode group (diodes 44 and 44' hereof) may be used as a measure of the rectified voltage in the power system and thus this source may be used as the equivalent of the negative feedback quantity referred to in the system of feedback quantities utilized in the power reactor-diode control of my prior application. Having thus established in the "miniature" reactor-diode stage a measure of the rectified voltage in the power stage the next step is to match this electrical quantity against a positive feedback quantity proportional to the power current. The object is to make the ratio of these two feedback quantities adjustable and to make the adjustability adapted to remote control. This can be accomplished in several ways but the arrangement illustrated in the accompanying drawing which utilizes the current transformer 55 and bridge network interconnected with the remote control means 64 has been found to operate very satisfactorily.

The operation of the two control reactor-diode groups will now be examined in more detail with specific reference to the identified elements of one group in order to simplify the description. Up to the moment of saturation of reactor 43 the voltage of the lower transformer tap 42 is impressed on the reactor-diode group 43—44. Very little current flows in the reactor circuit prior to saturation. The connecting diode 45 acts as a conducting medium, even though it has reversed polarity, because it carries current which flows through resistance 48 from the high voltage tap 41 to the lower voltage tap 42. At the moment of saturation the voltage impressed on the reactor-diode group 43—44 and the load impedance 46 collapses. However, a pulse of current through reactor 43 and load impedance 46 is derived from the higher voltage terminal 41 through resistance 48. The low impedance 46 builds up a peak of voltage in response to this current pulse but it is definitely limited by the resistance 48 so that the current in the load impedance including the control electrode circuit 8 of triode 6 is definitely limited. This pulse of current in load impedance 46 generates a sharp peak of voltage which fires triode 6 at the moment of saturation of reactor 43.

The condition of saturation in the control reactor 43 is determined by the position of the operator's contact control 67 of rheostat 64. In the illustrated position the rheostat control is in a standby or neutral position and no control current circulates in the control coils 54 and 54' and the triodes are in a nonconductive position and no current is flowing in the motor circuit. If the control arm 67 is moved to the left hand position as viewed in the drawing, the relay contact 25 will be in the biased position to close contacts 23 and thereby close a circuit through diode 20 so that the field excitation of field winding 19 will be in one direction to produce rotation in a direction which will be designated as a "forward" direction. Under these conditions it may be assumed that positive half waves of the alternating current supply pass through the field winding 19 and that the negative half waves are bypassed by diode 20 which is in a closed circuit to the field winding and conductive for negative half waves. In the first position of the control contact 67 when contact with resistance 65 is just established the positive electric quantity in the control coils 54 and 54' relative to the negative feedback electric quantity obtained through resistance 50 is arranged to effect full retard of the firing circuit of triode 6 so as to produce zero or minimum current flow in motor 18. Successive movement of contact arm 67 further in a counterclockwise direction (as viewed in the drawing) decreases the resistance 65 and increases the positive feedback quantity. This advances the point of firing of the triodes 6 and 7 so as to control the motor operation finally up to full torque and full speed.

Upon operation of the contact arm 67 just to make contact with resistance element 66 of control rheostat 64 the control coil 34 becomes energized from circuit 31 to activate relay coil 26 and causes contact 25 to open contacts 23 and close contacts 24. This operation simultaneously opens the circuit of diode 20 and closes the circuit of diode 21 so that the field winding 19 is now energized by the negative half waves of the alternating current supply circuit and the positive half waves are bypassed through the closed circuit of diode 21. Further movement of contact arm 67 in a clockwise direction will exclude more and more of resistance element 66 so that the net positive signal in the control coils 54 and 54' increases to advance the point of firing of triodes 6 and 7 and thereby control the motor for reverse operation up to full torque and full speed. In this arrangement the field excitation is changed from forward to reverse when the contact 67 is shifted from resistance branch 65 to branch 66. Therefore, the change takes place with relatively light duty on control contacts since the current is substantially zero whether or not the motor has been brought to stand-still or the shift was made for torque reversal for dynamic braking when the motor is at speed.

While I have shown and described a particular embodiment of my invention, it is my intention to cover in the appended claims all changes and modifications of the example herein chosen for the purpose of disclosure, which do not constitute departures from the spirit and scope of the invention.

What is claimed is:

1. In combination, an alternating current input circuit, a direct current motor circuit comprising armature and field windings, means including a pair of triodes interconnecting said input circuit and the armature winding of said motor and arranged to supply rectified direct current to said armature winding, each of said triodes being provided with a control electrode circuit, a source of alternating voltage connected to said input circuit and comprising a transformer having a pair of secondary windings, a pair of twin reactor-diode groups arranged with one group connected to each transformer winding, each reactor-diode group comprising a saturable reactor and a diode connected in series relation for energization from its associated secondary transformer winding, a low impedance connected in series relation with each reactor, the respective reactors being arranged to saturate in opposite polarity half cycles of applied alternating voltage with a consequent pulse of current upon saturation through said reactor and its series connected impedance thereby to generate a peak of voltage across said impedance, means in each reactor-diode group for establishing in each reactor a negative feedback electric quantity proportional to the rectified voltage of said direct current motor circuit, said negative feedback quantity being of a character to retard the moment of saturation in each said reactor, means for establishing a positive feedback electric quantity in each said reactor in proportion to the current in said input circuit, said positive feedback quantity being of a character to advance the moment of saturation in each said reactor, ratio-adjusting circuit means for adjusting the ratio of the said negative and positive feedback quantities selectively to determine the moment of saturation in each said reactor, circuit means interconnecting respectively the control electrode circuit of each triode to the impedance element of its associated reactor-diode group, thereby to determine the moment of firing of the respective triodes and the magnitude of the speed and torque of said motor, and circuit means interconnected with said ratio-adjusting means for selectively controlling the direction of energizing of said motor field winding and thereby the direction of rotation and direction of torque of said motor.

2. In combination, an alternating current input circuit, a direct current motor circuit comprising armature and field windings, means including a pair of triodes interconnecting said input circuit and the armature winding of said motor and arranged to supply rectified direct current to said armature winding, each of said triodes being provided with a control electrode circuit, a source of alternating voltage connected to said input circuit and comprising a transformer having a pair of secondary windings, each of said secondary windings having an intermediate voltage tap providing a first voltage source and a higher voltage tap providing a second voltage source, a pair of reactor-diode groups connected one with each transformer secondary winding, each such group comprising a saturable reactor and a first diode connected in series relation for energization from its associated transformer winding, a low impedance element connected in series relation with each reactor, a second diode in each group connected in series relation and reversely poled relative to the first diode of its associated group, a junction terminal between the first and second diode of each group, circuit means including a resistance element interconnecting the junction terminal of each group to the second voltage source of its associated secondary transformer winding, the respective reactors being arranged to saturate in opposite polarity half cycles of applied alternating voltage with a consequent pulse of current from said second source of voltage traversing said reactor and said impedance thereby to generate a peak of voltage across said impedance, means in each group for establishing in each reactor a negative feedback electric quantity proportional to the rectified voltage of said motor circuit an comprising a resistance element connected in series relation with said reactor to said first voltage source, said negative feedback quantity being of a character to retard the moment of saturation in each said reactor, means for establishing a positive feedback electric quantity in each said reactor comprising a pair of reversely connected windings inductively arranged one with each reactor of the respective groups, means including rectifier means for energizing said pair of windings by a direct current proportional to the alternating current in said input circuit, ratio-adjusting means, comprising a rheostat interconnected with said rectifier means and said pair of windings for adjusting the ratio of said negative and positive feedback quantities selectively to determine the moment of saturation in each said reactor, said rheostat having a neutral position intermediate two operating positions, means for controlling the direction of energization of said field winding, and circuit means interconnecting said ratio-adjusting means and said last mentioned means for determining the direction of the energization of said field winding in accordance with the operating position of said rheostat.

3. The combination as set forth in claim 2, further including means comprising a pair of windings reversely connected in closed circuit and arranged in inductive relation with the reactors of the respective reactor-diode groups.

4. The combination as set forth in claim 2 further characterized by an interconnection of said positive feedback control windings, said rectifier means and said ratio-adjusting means in an electric bridge circuit in which said ratio-adjusting means constitutes a variable resistance arm of said bridge circuit for controlling the ratio of the negative and positive feedback quantities of said system.

5. The combination as set forth in claim 2 further including a capacitor connected in parallel relation with the resistance element of each circuit means interconnecting the junction terminal between the first and second diode of each group and the second voltage source for accentuating the degree of sharpness of the impulse peak of voltage across the impedance connected in series relation with each reactor.

6. A motor control system comprising a direct current motor having armature and field windings, a rectifying four-arm bridge network having two sets of conjugate terminals and having triodes in one pair of adjacent arms of the bridge and diodes in the other adjacent arms of the bridge, each of said triodes being provided with a control electrode circuit, an alternating input circuit being connected to one set of conjugate terminals with said field winding interposed in series relation with said input circuit to a conjugate terminal of said one set, said armature winding being connected across the other set of conjugate terminals, a source of alternating voltage connected to said input circuit, a pair of twin reactor-diode groups connected to said source of alternating voltage with the reactors thereof arranged to saturate in opposite polarity half cycles of applied alternating voltage, means in each reactor-diode group for establishing in each reactor a negative feedback electric quantity proportional to the rectified voltage of said armature circuit, means interconnecting said input circuit and said reactors for establishing therein a positive feedback electric quantity proportional to the current in said input circuit, the negative and positive feedback quantities being of a character respectively to retard and advance the point of saturation in said reactors, ratio-adjusting means for adjusting the ratio of the respective feedback quantities selectively to determine the moment of saturation in each reactor, an impedance element connected in series relation with each reactor for deriving a peak of voltage in response to saturation in each said reactor, circuit means interconnecting respectively the control electrode circuit of each triode to the impedance element of its associated reactor-diode group thereby to determine the moment of firing of the respective triodes and the magnitude of the speed and torque of said motor, means connected to said field winding for changing the direction of current therein, and means interconnecting said last-mentioned means and said ratio-adjusting means for selectively controlling the direction of energization of said field winding and thereby the direction of rotation and direction of torque of said motor.

7. The motor control system of claim 6 in which the means connected to the field winding for changing the direction of current therein comprises a pair of reversely poled diodes connected in bypass circuits to said field winding and arranged respectively to conduct half cycles of alternating current of opposite polarity, and with relay means controlled in accordance with the operating position of said ratio-adjusting means for selectively closing a bypass circuit through one or the other of said bypass diodes.

8. The motor control system of claim 7 in which the ratio-adjusting means comprises a rheostat having a control contact with a neutral open circuit position and two operating positions, a magnetic amplifier comprising a saturable reactor connected in circuit with said relay to control the energization thereof, and a saturation control coil inductively related to said reactor and connected to be energized when said rheostat control contact is moved from its neutral position to one of its operating positions.

No references cited.